March 27, 1945.　　　S. DAWSON　　　2,372,362
COOKER
Filed Aug. 21, 1941　　　4 Sheets-Sheet 2

INVENTOR.
Sidney Dawson
By Clarence E. Threedy
HIS ATTORNEY

Patented Mar. 27, 1945

2,372,362

UNITED STATES PATENT OFFICE 2,372,362

COOKER

Sidney Dawson, Chicago, Ill., assignor to Richard Groetchen, Chicago, Ill.

Application August 21, 1941, Serial No. 407,748

14 Claims. (Cl. 126—41)

This invention relates to cooking implements, more particularly to an automatic cooker, and has for one of its objects the provision of an improved structure which will be economical in manufacture and construction and highly efficient in use.

One of the salient objects of my present invention is to provide a cooker having a circular housing divided into a plurality of compartments constructed to provide a through draft through the housing, whereby to utilize the maximum heat efficiency from a common heat source and to establish a transient heat through the cooking compartments.

Another object of the present invention is to provide a novel dividing wall between the broiler chamber and preheating chamber which dividing wall effects a heat refraction as well as a baffle whereby heat produced by the burner structure will be intensified at the crucial point of cooking.

It is still another object of my invention to provide a common drive for a plurality of food supporting grilles to produce a constant movement of such supported foods through a cooking operation in a predetermined time.

A further object of this invention is to provide a friction drive for the rotatable grilles whereby to prevent injury to the device in the event of a jamming of articles on the grille as well as to permit a ready movement of such grilles by hand to change their position relative to the ordinary drive action.

A still further object of the present invention is to provide a novel arrangement of burner and heat reflecting means together with food containing vessels whereby to attain a temperature of sufficient intensity to assure a complete cooking of the food in a minimum of time.

The invention contemplates a combination of parts which will facilitate cooking of what is generally known as short orders such as steaks, chops, half chicken, bacon, eggs and the like and to retain in such foods all of the juices and flavors so as to produce delicious and palatable edibles containing all of the nutrition found in the original food in its raw or uncooked state.

A more particular object of the present invention is to provide means for producing an intensified heat by which a penetrating and seeping cooking process is carried into effect in the shortest space of time assuring a prompt serving of orders of cooked foods without any undue delay.

The construction of the present device results in a cooker which will remain clean over a long period of cooking without need for cleaning at short intervals, such structure, however, being readily accessible for cleaning purposes as and when desired.

Other objects and advantages will become more fully apparent in view of the description to follow when read in the light of the accompanying drawings wherein.

Figures 1, 2, 6, 7:
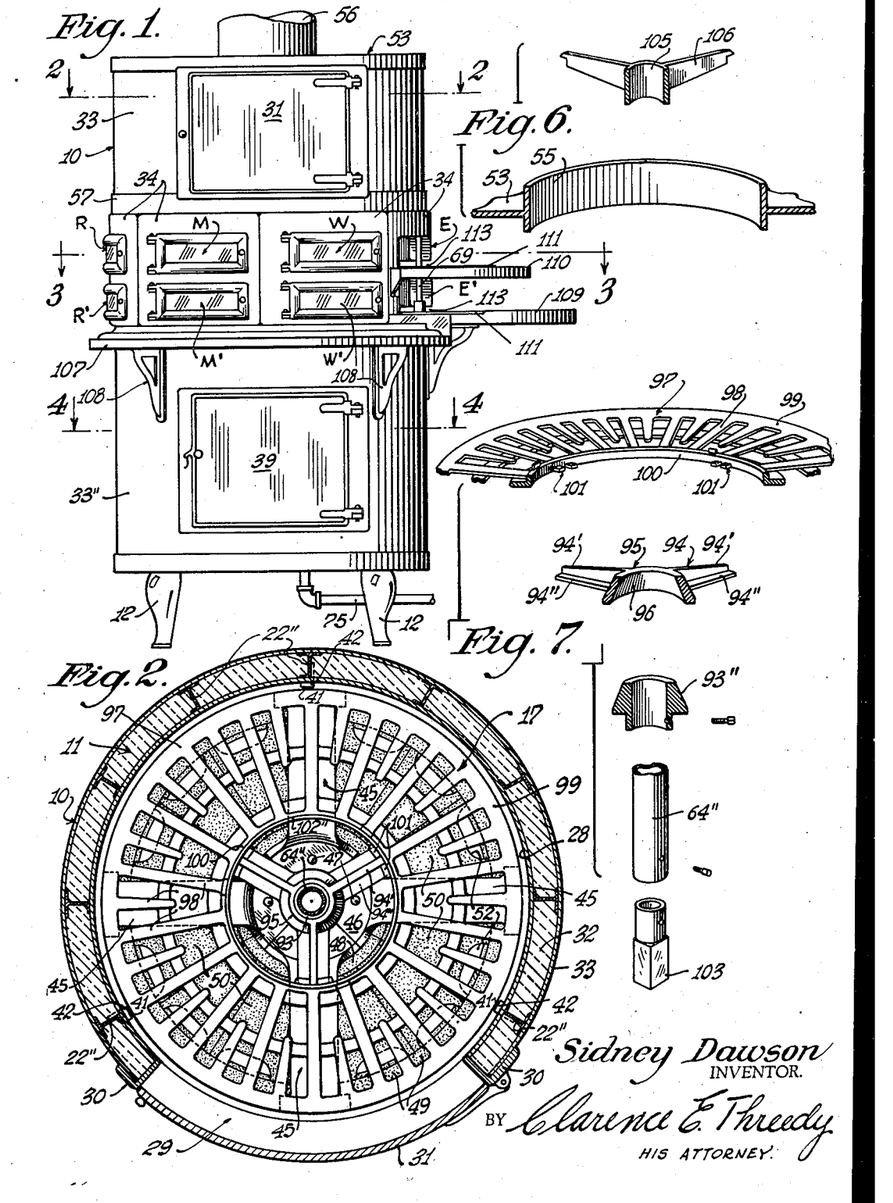
Fig. 1 is a front elevational view of my new cooker.
Fig. 2 is a horizontal sectional view, partly in plan, taken through the upper or preheating chamber along line 2—2 in Fig. 1.
Fig. 6 is an exploded perspective assembly, partly in section, illustrating the stack collar and upper support for the common drive shaft seen in Fig. 5.
Fig. 7 is an exploded perspective assembly, partly in section, illustrating the relation of a rotatable grille disc to the cone or friction drive arranged on the common drive shaft.
Figure 5:
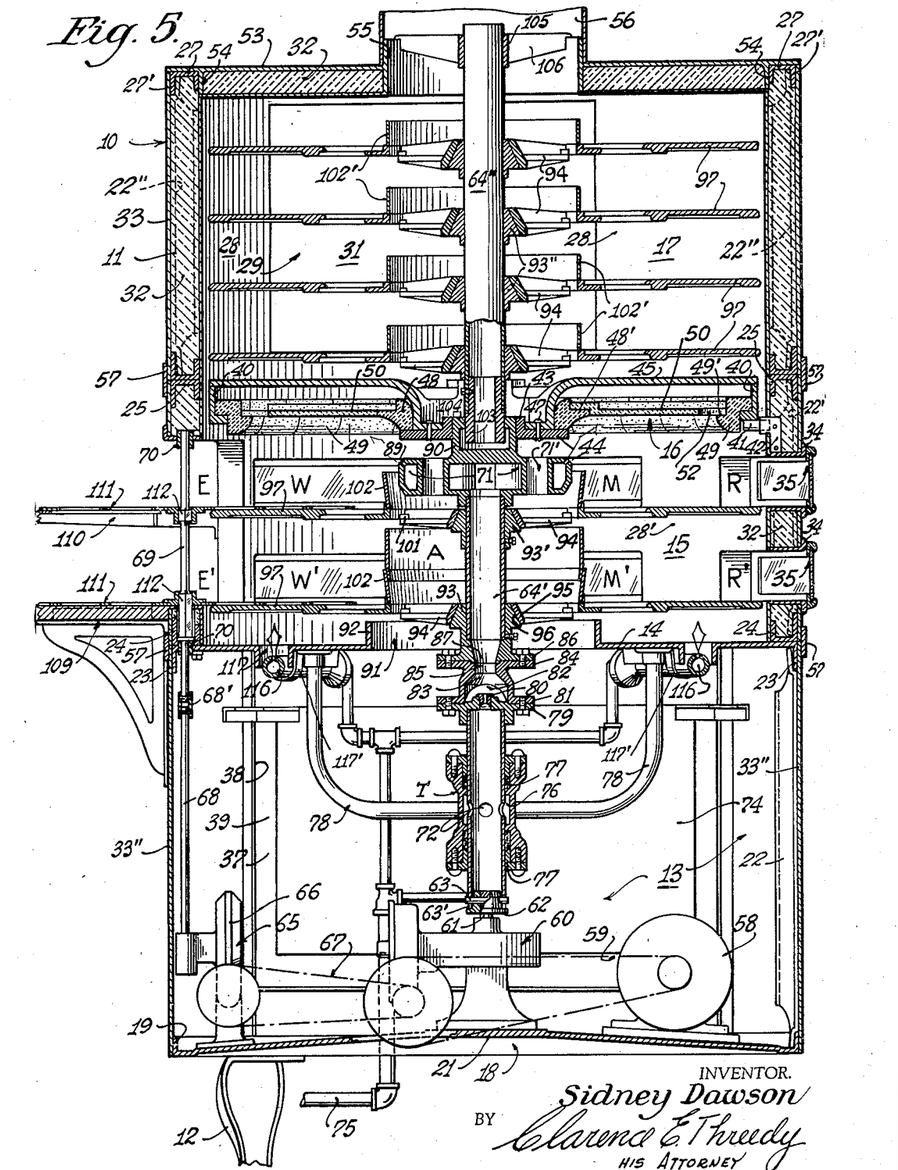
Fig. 5 is a vertical sectional detail through the entire cooker assembly and is taken looking in the direction of the arrows along line 5—5 in Fig. 3.

The cooker is generally indicated at 10 and consists of a cylindrical casing 11 arranged on a set of legs 12. Referring particularly to Figs. 1 and 5, the casing 11 is built in three main sections to provide a utility chamber 13 shown in Fig. 4 having a top wall 14 which comprises a lower wall for a cooking and broiling chamber 15 shown in plan view in Fig. 3, above which is arranged a heat reflector 16 of refractory material to form a dividing line between the chamber 15 and an uppermost compartment 17 which comprises a preheating chamber, best illustrated in plan in Fig. 2.

The casing 11 is built upon a bottom frame 18 (Fig. 4) supported on the legs 12 and having an annular flanged ring 19 with radially arranged cross bracing 20 formed integrally at their point of convergence with a web 21 extending diametrically across the frame 18 to provide a support for certain drive means later to be explained. Extending upwardly from the frame 18 along the annular ring 19 are a plurality of strut members 22 having their upper ends fixed to a depending flange 23 on the top wall 14 which is in the form of a circular partition.

Arranged on this partition 14, along its peripheral edge, is a flanged ring 24 which is bolted at intervals to the partition 14. Strut members 22' are arranged on the flange ring 24 to extend upwardly therefrom and have their upper ends fixed to a ring 25 similar to the ring 24 but inverted so as to provide a depending flange. Thus is formed the frame work for the intermediate or broiler chamber 15.

Another flanged ring 26 similar to 24 and 25 is arranged above and is bolted to the ring 25 to provide a base upon which is arranged strut members 22" supporting at their upper end an annular ring 27 with depending flanges 27' thus forming the frame work for the preheating chamber 17. This upper chamber 17 is lined with a sheet metal 28 and is provided with a door opening 29 in which is mounted a frame 30 adapted to hingedly support a door 31. A heat insulating material 32 is placed in the segmental spaces between the struts 22" and an outside dressing of sheet metal 33 arranged around the frame work.

The intermediate chamber 15, like the chamber 17, is both lined and covered with sheet metal 28' and 33' respectively, within which is placed the heat insulating material 32. This compartment being the actual cooking and broiling chamber is provided with a series of openings best illustrated in Figs. 1 and 3, wherein it will be seen that there are a pair of openings placed one above another, the upper ones being indicated as R, M, W and E reading from left to right, and the lower ones indicated as R', M', W' and E' respectively. Each of the openings R, M, W and R', M', W' is provided with a suitable frame 34 adapted to hingedly support a door 35 having a glass panel through which the interior of the chamber 15 is visible. The openings E and E' have one common frame 36 for reasons hereinafter to be explained.

The utility compartment 13 is merely covered by an outside dressing 33" and is provided with an opening 37 having a frame 38 for hingedly supporting a door 39.

Figures 8, 9, 10, 11:
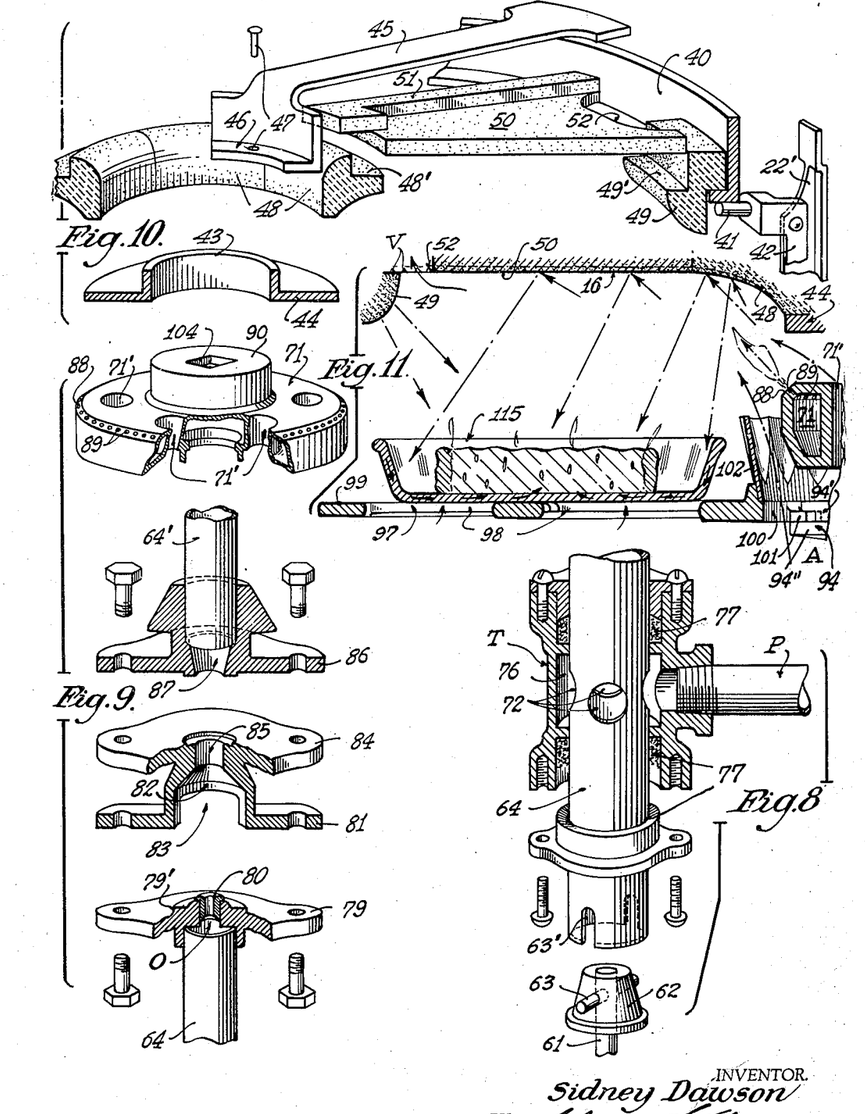
Fig. 8 is a fragmentary perspective view, partly in section, and showing the assembly of the rotatable common drive shaft and its power take-off together with the slip connection with the fuel supply line (bottom of Fig. 5)
Fig. 9 is an exploded perspective view, partly in section, illustrative of the burner assembly forming a part of the common drive shaft and as seen in the mid-portion of Fig. 5.
Fig. 10 is an exploded perspective view, partly in section of the refractory partition between the broiler and preheating compartments together with the supporting means for such partition.
Fig. 11 is an enlarged fragmentary sectional detail taken through one radial portion of the broiler compartment, substantially as seen in Fig. 5, illustrating the trajectory of heat in the broiling operation.

As was hereinbefore stated, the chambers 15 and 17 are divided by a heat reflecting partition 16, the construction of which will now be explained. Reference being had to Figs. 5 and 10, a flanged ring 40 is arranged on a three point support in the form of radially extending pins 41 carried by brackets 42 in turn fixed to strut members 22' at desired positions as shown in Fig. 2. An inner ring 43 having a flared disc flange 44 is supported concentrically of the ring 40 by means of radially extending brackets 45 having their segmental and depressed inner ends 46 attached as at 47 to the disc 44 to allow a partial extension thereof beyond the ends 46, the outer ends of these brackets 45 lying on top of the upstanding ring 40 and preferably, though not necessarily, fixed thereto by brazing or bolting.

The foregoing constitutes a supporting frame for the refactory material 16 which is made up of an annular row of blocks of refractory material arranged on the horizontal flange of the inner ring 43 and also one on the horizontal flange of the ring 40 to provide an inner and an outer supporting ring, the first of which comprises a plurality of arcuate segments 48 having a supporting ledge 48' and the second of which likewise comprises a plurality of segments 49 conforming to the arch of the ring 40 and having a supporting ledge 49'. Spanning the ledges 48' and 49' are a plurality of slabs 50 in segmental form having an overlapping projection 51 adapted to overlie the abuting joint between adjacent slabs, each slab having a concavity 52 formed in its outer peripheral edge to provide a by-pass for air circulation as will appear more readily hereinafter.

To complete the casing 11 there is provided a top frame 53 having an annular flange 54 which is adapted to fit down over the upper edge of the cylindrical wall of the pre-heating chamber 17 to close the upper end thereof and to provide a centrally located collar 55 upon which may be arranged a stack or flue 56 to conduct fumes and exhaust hot air away from the cooker. This frame has insulation material 32 arranged between its interior and exterior metal dressing and is removable as a unit from its inserted relation with respect to the cylindrical wall.

Trim bands 57 surround the casing 11 at the dividing lines of the several compartments and to otherwise give the outer dressing a neat and pleasing appearance.

Figures 3, 4, 12, 13:
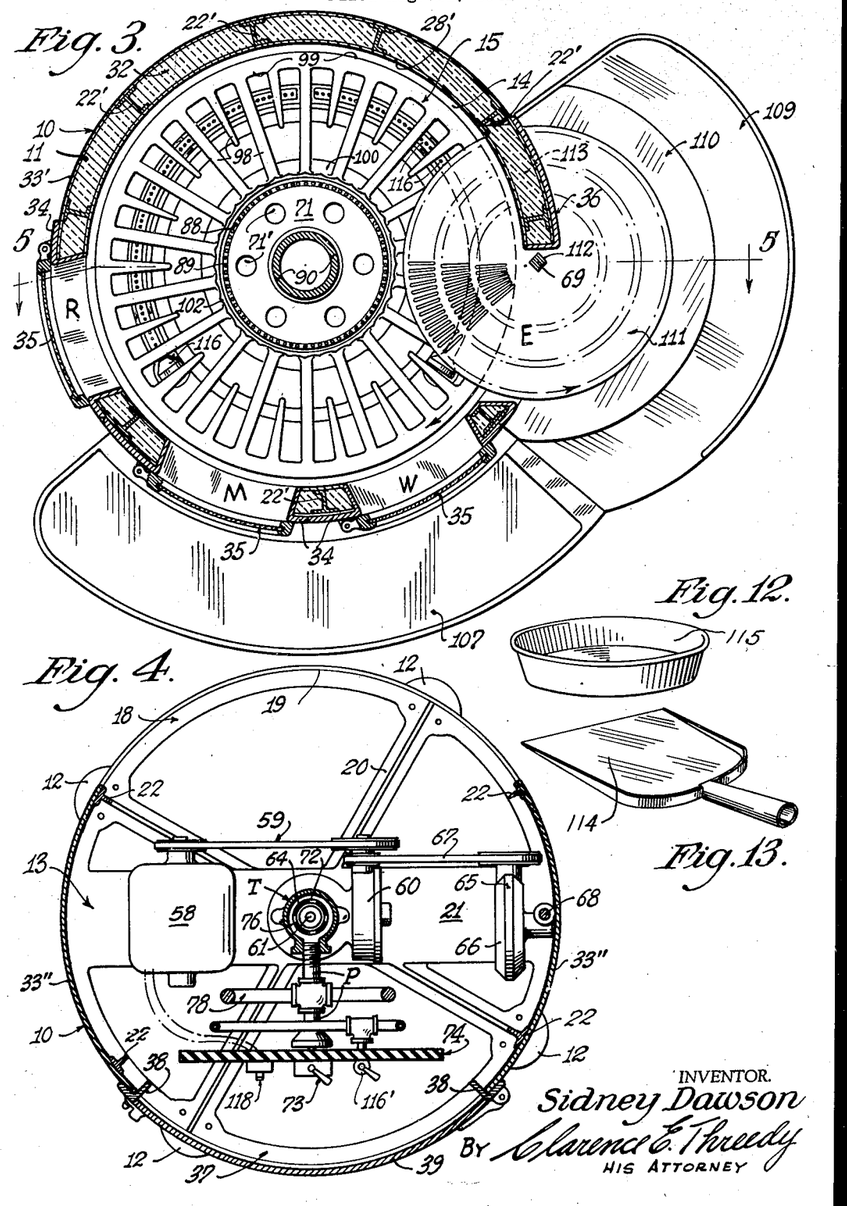
Fig. 3 is a horizontal sectional view, partly in plan, taken through the broiler chamber along line 3—3 in Fig. 1.
Fig. 4 is a horizontal sectional view, partly in plan, taken through the utility compartment along line 4—4 in Fig. 1.
Fig. 12 is a perspective view of a casserole dish, such as is seen in section in Fig. 11, for retaining the substance to be heat treated.
Fig. 13 is a perspective view of a spade utilized by the operator of the present cooker to move casserole dishes about in the process of feeding and unloading the cooker.

Having thus described the casing 11, I shall now explain the embodiments of the utility compartment (reference being had to Figs. 4 and 5). The main purpose of the utility compartment is to house the various control instrumentalities including a drive means consisting of an electric motor 58 supported on the web 21 and having drive connection through the medium of a belt and pulley arrangement 59 with a speed reducing unit 60. This latter unit 60 is fixed to the web 21 and includes a gear mechanism (not shown) from which extends a drive shaft 61 coaxially arranged with respect to the cylindrical casing 11. The shaft 61 carries for rotation therewith a coupling block 62 having a radially extending pin 63 adapted to fit into slots 63' formed in a tubular shaft 64 to drivingly connect the shaft 61 to the tubular shaft 64 (see Fig. 8) so as to rotate the latter and the parts connected thereto.

An auxiliary drive mechanism is generally indicated at 65 and includes a speed reducing gear housing 66 having belt and pulley connection 67 with the main power takeoff 59. The housing 66 in mounted on the web 21 and provides a vertically extending drive shaft 68 adapted to be coupled as at 68' to a drive shaft 69 mounted for rotatable movement in aligned bushings 70 arranged in the frame work of the casing wall at the openings E and E' for purpose of driving an ejector means later to be referred to.

The burner unit will now be explained insofar as it relates to the general combination of elements going to make up the rotary cooker unit of my present invention. The burner unit forms the subject matter of my co-pending application Serial No. 407,749, filed August 21, 1941, on even date herewith.

The tubular shaft 64 heretofore mentioned in addition to being a rotatable shaft is also a conduit through which fuel gas is supplied to a main burner 71. The supply of fuel gas enters the shaft 64 through ports 72 formed in its midsection whereat there is arranged a T connection which permits rotative movement of the shaft 64 and at the same time assures a constant flow of fuel from a fixed source of supply. This T connection is threadably connected to a pipe length P having a cock valve 73 arranged on an instrument panel 74 fixedly supported within the utility compartment 13 and having its control side accessible through the door opening 37. The valve 73 controls the fuel flowage from a supply pipe 75. The connection T provides a cylindrical chamber 76 around the tubular shaft 64 in the region of the ports 72 and is provided with a packing sleeve 77 at each end, coaxially with the shaft 64 to provide an adequate seal under normal gas pressure. This T connection is supported in its vertical position by a pipe bracket 78 suspended from the under side of the partition 14, and carrying the pipe length P just adjacent its point of entry into the T connection.

The upper end of the tubular shaft 64 has brazed thereon a flange element 79 best illustrated in Fig. 9. An opening O is formed in this flange 79 coaxially with the shaft 64 and arranged in this opening O is a bushing having a relatively small orifice 80 formed therein. This orifice flange 79 has a raised shoulder formation 79' upon which is mounted by suitable stud bolts the lower flange 81 of a double flanged casting comprising an air inlet chamber 82, there being a pair of openings 83 formed in the side walls of this mixing chamber 82 adjacent the orifice 80. The mixing chamber 82 is restricted immediately above the openings 83 to form a Venturi tube 85 adjacent the upper flange 84 on the double flanged casting, in which Venturi tube 85 the fuel gas emitted from the orifice 80 and the air entering the openings 83 are properly combined to render such mixture combustible. A third flanged casting 86 is arranged above the two foregoing flanged elements and is adapted to be bolted onto the flange 84 coaxially therewith. This casting has a flared opening 87 formed therein forming an exit from the Venturi tube 85 and adapted to convey the mixed fuel emitted therefrom into a tubular shaft 64' forming an extension of the shaft 64. The upper end of the shaft 64' has brazed thereon the main burner 71 which is provided along a beveled upper peripheral edge 88 with a plurality of openings 89 through which the mixed fuel gas emits for actual combustion.

The burner 71 is formed of a casting having an annular extension 90 projecting upwardly from the burner proper. This portion 90 is arranged coaxial with the shafts 64—64' and is adapted to be rotatably supported in the ring 43 forming a part of the supporting frame for the refactory partition 16. Thus it is seen that the entire burner structure is rotatably arranged within the casing 11 for rotative movement by the drive shaft 61. It will be noted that the mixing chamber 82 is arranged in the utility compartment 13 where there is always a fresh supply of air for entry into the openings 83 of the chamber 82, and that the burner 71 is positioned closely adjacent the refractory material 16 forming an upper wall of the broiler compartment 15. The partition 14 forming the bottom wall of the compartment 15 has formed therein a central opening 91 having an upstanding flange ring 92.

The third flanged casting 86 has formed thereon a frusto-conical boss 93 which surrounds the tubular shaft 64'. A tri-spoked casting termed a spider 94 having a hub formation 95 with an interior frusto-conical opening 96 complementary to the boss 93 is adapted to fit upon the latter to constitute a friction drive for a circular grille plate 97 which is adapted to be carried by the spider 94. The grille plate 97 is preferably a casting having a series of radially disposed spoke elements 98 joined at their outer ends to an annular ring 99 and at their inner ends to a central ring and collar 100 providing a central opening substantially greater in diameter than the outer diameter of the burner 71. The inner wall of the collar 100 is provided with spaced lugs 101 adapted to interlock with the outer ends of the spokes 94' on the spider 94 and to rest upon a horizontal flange 94'' of such spokes. The foregoing structure is arranged in a horizontal plane just above the lower wall 14 of the broiler chamber 15 so as to be accessible through the openings R', M', W' and E' and is typical of the construction of other rotatable grille plates in the device as will be readily seen in Fig. 7. Another such grille 97 and spider 94 assembly is arranged on a friction cone 93' which is fixed by means of a set screw to the tubular shaft 64' immediately below the burner 71 to support a rotatable grille 97 for access through openings R, M, W and E in spaced relation with respect to the reflector plate 16 to attain the full benefit of heat reflected therefrom.

A plurality of grille plates 97 are rotatably arranged in the preheating chamber, each of them being accessible through the opening 29 and having support on a spider 94 which in turn is frictionally coupled to a drive cone 93''. These drive cones 93'' are fixedly arranged on a shaft 64'' which is in axial alignment with the shafts 64 and 64' and which shaft 64'' has at its lower end a square coupling key 103 adapted to be arranged in a square opening 104 formed in the axial extension 90 on the burner 71. The upper end of the shaft 64'' is rotatably supported in a bearing 105 supported by radially extending legs 106 which rest upon the upper edge of the stack collar 55 (see Figs. 5 and 6). By this arrangement it will readily be seen that all of the grille plates 97 are rotatable with the drive shafts 64, 64' and 64'' and that anything carried by these grille plates 97 will likewise rotate therewith.

On each of the collars 100 of the broiler compartment grille plates 97 there is arranged an annular ring 102 which rings as will be noted in Fig. 5 form a stack or air passage A communicating with the utility compartment 13 and the burner 71 so as to supply oxygen to the place of combustion and thus eliminate the danger of monoxide gas being generated or storing up within the cooking and preheating chambers. The grille plates in the latter chamber 17 are likewise provided with annular rings 102' but these normally form a baffle tending to keep the heat out in that area of the grilles 97 where the carrying of articles is accomplished; rising gases finally exits through the stack 56 where a constant draft is maintained assuring a circulation from bottom to top of the device.

The outside of the casing 11 is provided with suitable counters or shelving there being one indicated as 107 arranged below the lowermost openings to the broiler compartment 15 and suitably supported on brackets 108. This shelf 107 may be termed a loading platform as distinguished from a discharge station which comprises a pair of super-imposed shelves one of which is indicated at 109 and the other at 110. The discharge shelf 109 is arranged in the same horizontal plane as the lowermost grille plate 97 in the broiler chamber 15 while the shelf 110 is in the same horizontal plane as the uppermost one of the grille discs 97 in that chamber.

As is best illustrated in Figs. 3 and 5 there is provided an ejector disc 111 at each of the levels of the shelves 109 and 110 which discs 111 are keyed as at 112 to the auxiliary drive shaft 69 which normally rotates in a direction opposite to the direction of rotation of the grille 97 as is indicated by the arrows in Fig. 3, the exiting radius of the ejector discs 111 passing through the opening E or E', as the case may be, the frame 36 to such openings being provided with a horizontal slit or opening 113 to permit passage of the entering radius of such discs 111 into the broiler chamber 15.

There is employed in my new cooker containers or casseroles 115 best shown in Fig. 12 which casseroles 115 are placed on the grille plates 97 in the preheating chamber in numbers. To facilitate handling of these casseroles 115, there is preferably employed a spade 114 shown in Fig. 13. At the commencement of a cooking period the valve 73 is turned on and the fuel emitted from burner 71 ignited. A second or auxiliary burner 116 is arranged in an arcuate slot 117 formed in the partition 14 and on straps 117' which burner 116 is under the control of a separate valve 116' on the instrument panel 74. Both of the burners 71 and 116 are ignited and a number of empty casseroles 115 having been deposited in the upper or preheating chamber 17, the motor 58 is started by means of an electric switch 118 on the panel 74 whereupon the shaft 64 will be rotated and with it the burner 71 as well as the grille plates 97. When the interior of the casing 11 reaches a desired heat, for best results usually 400° F. in the preheating chamber 17 and approximately 700° F. in the broiler compartment 15, the device is in readiness for cooking operation.

Assuming that an order has been placed for a steak, a casserole 115 is taken out of the preheating chamber with the spade 114, a bit of butter or other substitute placed therein and the raw steak deposited in the casserole. The heat of the preheated casserole will sear the downface of the steak thus browning the same to a desired hue. The casserole is then placed in the broiler chamber through any one of the openings R, M, or W; R in the event a rare steak is desired; M should the customer want it medium rare and W for a well done steak; the difference in each case being the period of time that it will require the casserole to travel from a particular opening to the fixed exit E. For the broiling operation attention is directed to Fig. 11 wherein there is illustrated a casserole with steak therein and positioned beneath the refractory wall 16. It being remembered that the burner 71 and grille 97 are constantly rotating in a clockwise direction, it will be noted that the thoroughly consumed fuel gas casts a flame comingling with air rising from the air shaft A, both along side of the burner 71 as well as through the spaced openings 71' in the burner assuring complete combustion and eliminating all monoxide gases. The heat from this flame strikes the lower wall of the refractory material 16 and is reflected along lines substantially as indicated diagrammatically by the dot-dash lines and arrows down upon the slowly moving casserole and steak. Some of the heat is transmitted into the casserole which is preferably made of a highly heat conductive material and as indicated by the arrows within the bottom of the casserole such heat is passed up into the food being cooked. The heat at this broiling position is extremely intense by reason of the arrangement of the burner 71 with respect to the refractory plate which assures that a maximum heating efficiency will be obtained in the food being cooked within the time it takes the casserole to reach the exit E. It has been discovered in this arrangement by peering through the door 35 that all or any tallow in the meat is completely burned up before the food reaches the ejector 111, which burning of the tallow results in a complete absence of any tallowy taste in the cooked food.

As the casserole with steak therein reaches the ejector disc 111 it rides upon the disc 111 and will be conveyed through the exit E onto the discharge shelf 110 where it may be immediately removed together with the hot casserole for serving.

In the case of fowl or other meats requiring a roasting or penetrating heat such food after having passed through the foregoing operation of the broiler may be placed in any one of the lower doors R', M', or W' where the heat rising from the auxiliary burner 116 together with that of the burner 71 will have a more penetrating effect on the meat and the juices therein resulting in a cooking to the bone. Such dishes are likewise discharged by an ejector disc 111 onto the lower shelf 109 ready to be served.

The preheating chamber may be utilized as an oven for baking by placing potatoes or the like in a casserole at any of the levels provided by the several grille discs 97. One of the advantages of the friction drive on these grille plates 97 is that upon opening the door 31 the operator need not wait until a desired tray or casserole is exposed at the open door 31 but may grasp the rim 99 with a suitable heat-resistant pad and rotate the grille by hand without affecting the ordinary driving action on the other grilles. Also in the event several casseroles became jammed on a grille plate 97, between the inner wall of the casing 11 and the annular rings 102—102' within either the heating chamber 15 or the preheating chamber 17, a stoppage of the grille 97 will in no wise affect the drive means or overload the motor.

It is particularly pointed out that by reason of the normal draft passages provided by means of the passage "A" and the concaved openings 52 at the periphery of the refractory slabs 50, together with the stack 56, there is a constant circulation through the cooker housing, thereby making the heat generated by the burner 71 a transient heat rather than a static heat as is found in cookers heretofore known.

In accordance with ordinances prevalent in local communities the present device is constructed so that the burner structures may be readily removed for inspection and cleaning. As was heretofore explained in view of Figs. 4 and 9 the burner 71 is centrally mounted within the casing 11. In order to remove the burner 71 the bolts at the flanges 79 and 81 are unscrewed and the entire shaft 64' raised up including the spiders 94 and the grilles 97. The grilles in the preheating chamber are rested on blocks (not shown) as are the grille plates 97 in the broiler chamber. The shaft 64' with the burner head 71 can then be lowered as a unit including the spiders 94 which are now detached from engagement with the ring 100 and the lugs 101 therein. In its downward or withdrawal movement the burner unit is tilted with the Venturi casting offset from the main drive shaft 64 until the burner head 71 passes below the opening 91 formed in the wall 14 which divides the chambers 13 and 15 from each other. The burner unit is then clear for inspection and cleaning and may be reassembled into operative position by a reversal of the foregoing steps of detachment.

The auxiliary burner 116 is built in two sections as will be seen in Fig. 3 and by merely shifting them in a direction away from their fuel supply they too may be removed for inspection and cleaning.

Having thus described my cooker it will be apparent that I have provided a novel arrangement of parts which cooperate to produce a maximum and efficient heat in a minimum of time to speed up present-day short order cooking as well as to guarantee a uniformity of result.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An automatic cooker including a casing comprising a utility chamber, a broiler chamber and a preheating chamber, a hollow shaft constituting a fuel conduit and arranged in said casing for rotatable movement with respect thereto, a burner arranged on said shaft adjacent its upper end, drive means in said utility chamber for rotating said shaft, heat reflecting means forming a partition between the broiler chamber and said preheating chamber and adapted to receive the flame from said burner, means for supporting said heat reflecting means and for providing a bearing for the upper end of said shaft, a rotatable grille arranged in said broiler chamber and means carried by said shaft for rotatably supporting said grille for movement with said shaft.

2. An automatic cooker including a casing, heat reflecting means dividing said casing into a broiler chamber and a preheating chamber, a tubular shaft comprising a conductor means for fuel and arranged coaxially in said casing for rotatable movement, drive means in the casing and supporting the lower end of said tubular shaft for rotatable movement, burner means arranged at the upper end of said tubular shaft and having a portion thereof rotatably journaled in said heat reflecting means, and grille means arranged in said broiler chamber on said tubular shaft for rotating movement therewith.

3. An automatic cooker including a casing comprising a utility chamber, a broiler chamber and a preheating chamber, a hollow shaft constituting a fuel conduit and arranged in said casing for rotatable movement with respect thereto, a burner arranged on said shaft adjacent its upper end, drive means in said utility chamber for rotating said shaft, heat reflecting means forming a partition between the broiler chamber and said preheating chamber and adapted to receive the flame from said burner, means for supporting said heat reflecting means and for providing a bearing for the upper end of said shaft, a rotatable grille arranged in said broiler chamber, means carried by said shaft for rotatably supporting said grille for movement with said shaft, said casing having an opening in its upper wall adapted to communicate with a stack, said shaft having an extension drivingly connected thereto for rotation therewith and extending to the upper wall of said casing, and means on said extension for rotatably supporting a plurality of grille plates within said preheating chamber.

4. An automatic cooker including a casing comprising a utility chamber, a broiler chamber and a preheating chamber, a hollow shaft constituting a fuel conduit and arranged in said casing for rotatable movement with respect thereto, a burner arranged on said shaft adjacent its upper end, drive means in said utility chamber for rotating said shaft, heat reflecting means forming a partition between the broiler chamber and said preheating chamber and adapted to receive the flame from said burner, means for supporting said heat reflecting means and for providing a bearing for the upper end of said shaft, a rotatable grille arranged in said broiler chamber, means carried by said shaft for rotatably supporting said grille for movement with said shaft, said casing having an opening in its upper wall adapted to communicate with a stack, said shaft having an extension drivingly connected thereto for rotation therewith and extending to the upper wall of said casing, a bearing for the upper end of said extension and normally disposed in said opening in the upper wall of the casing, and means on said extension for rotatably supporting a plurality of grille plates within said preheating chamber.

5. In a rotary cooker a casing including a top wall having an opening formed therein, means dividing the casing into separate compartments, one of said means comprising a heat reflector and providing a central bearing, a tubular shaft mounted in said casing, a burner means including a boss portion and mounted on the upper end of said shaft and disposed in close proximity to said heat reflector with the boss portion of said burner rotatably supported in said bearing, drive means at the lower end of said tubular shaft and means for coupling the shaft to the drive means for rotatable movement thereby, an auxiliary shaft axially aligned with said tubular shaft and means for connecting the same to the boss portion of said burner for rotation therewith, bearing means centrally supported within the opening formed in the top wall of the casing for rotatably supporting the upper end of the auxiliary shaft, grille means in each of said compartments and means on said tubular shaft and said auxiliary shaft for drivingly connecting the shafts to said grille means.

6. In a rotary cooker a casing including a top wall having an opening formed therein, means dividing said casing into separate compartments, one of said means comprising a heat reflector and providing a central bearing, a tubular shaft mounted in said casing, a burner means having a boss formation thereon and mounted on the upper end of said shaft and disposed in close proximity to said heat reflector with the boss formation of said burner rotatably supported in said bearing, drive means at the lower end of said tubular shaft and means for coupling the shaft to the drive means for imparting rotatable movement to the shaft, an auxiliary shaft axially aligned with said tubular shaft and means for connecting the same to the boss formation of said burner for rotation therewith, a bearing means centrally supported within the opening formed in the top wall of the casing for rotatably supporting the upper end of the auxiliary shaft, grille means in each of said compartments, means on said tubular shaft and said auxiliary shaft for drivingly connecting the shafts to said grille means, each of said last named means comprising a friction cone adapted to be carried by said shafts and a spider casting having a central opening formed therein and adapted to frictionally engage said cone for rotatable movement therewith.

7. An automatic cooker including a casing comprising a utility chamber, a broiler chamber and a preheating chamber, a hollow shaft constituting a fuel conduit and arranged in said casing for rotatable movement with respect thereto, a burner arranged on said shaft adjacent its upper end, drive means in said utility chamber for rotating said shaft, heat reflecting means forming a partition between the broiler chamber and said preheating chamber and adapted to receive the flame from said burner, means for supporting said heat reflecting means and for providing a bearing for the upper end of said shaft, a rotatable grille arranged in said broiler chamber, means carried by said shaft for rotatably supporting said grille for movement with said shaft, said casing having an opening in its upper wall adapted to communicate with a stack, said shaft having an extension drivingly connected thereto for rotation therewith and extending to the upper wall of said casing, means on said extension for rotatably supporting a plurality of grille plates within said preheating chamber, each of said last named means comprising a friction cone adapted to be carried by said shaft, and a spider casting having a central opening formed therein and adapted to frictionally engage said cone for rotatable movement therewith, said spider casting having flange means arranged to engage a grille plate to support the latter for rotation.

8. In an automatic cooker including a casing having an upper wall and means dividing the casing into a utility chamber, a broiler chamber and a preheating chamber, said means comprising a lower baffle between said utility chamber and said broiler chamber and having a central opening and a refractory baffle between said broiler chamber and said preheating chamber and providing a passage at its peripheral edge, a burner disposed within said broiler chamber and adapted to project heat upwardly against said refractory baffle, and a stack on the upper wall of said casing whereby to create a draft of air through said opening in said lower baffle and the passage at the peripheral edge of said refractory baffle to permit passage of heated air from said burner to said preheating chamber.

9. In a cooker, a casing, means rotatably supporting a burner within said casing, said means comprising a tubular shaft, drive means for said shaft, a centrally disposed bearing arranged in the casing and adapted to rotatably support the upper end of said burner, a rotary grille arranged in said casing and adapted to support food containing casseroles, means on said shaft for supporting said grille for rotary movement adjacent said burner and heat reflecting means disposed in the plane of said bearing adjacent the upper end of said burner for receiving heat from the latter and for deflecting and concentrating said heat upon said rotary grille in the region of support of the food containing casseroles.

10. In a cooker, a casing having an entrance opening and an exit opening formed therein, means rotatably supporting a burner within said casing, said means comprising a tubular shaft, drive means for said shaft, a centrally disposed bearing arranged in the casing and adapted to rotatably support the upper end of said burner, a rotary grille arranged in said casing and adapted to support food containing casseroles, said rotary grille being in a horizontal plane so as to be accessible through said entrance and exit openings, means on said shaft for supporting said grille for rotary movement adjacent said burner, heat reflecting means disposed in the plane of said bearing adjacent the upper end of said burner for receiving heat from the latter and for deflecting and concentrating said heat upon said rotary grille in the region of support of the food containing casseroles, and means for conveying a casserole from the interior of said casing to the exterior thereof when said casserole arrives adjacent said exit opening.

11. In a rotary cooker, a housing having a cylindrical vertical wall, a bottom frame forming an open bottom wall and a closed top wall having an opening formed therein coaxially with respect to said housing and adapted to communicate with a stack, a centrally disposed drive shaft and rotary shelves arranged thereon, means on said bottom frame for driving the shaft, bearing means on said top wall within said opening therein for rotatably supporting the upper end of said shaft, means spaced substantially above said bottom frame and forming a bottom wall for a broiler chamber, said last-named means having an annular opening formed therein to permit passage therethrough of the drive shaft and to provide a flue for the entrance of air, spaced substantially above said means forming the bottom wall for the broiler chamber, to provide an upper wall for said broiler chamber and for diverting air rising through said flue toward the inner peripheral wall of said housing prior to the rising of said air to the opening formed in the top wall, and burner means arranged on said shaft within the broiler chamber and adapted to convey fuel gas to said chamber for combustion with said influx of air through said flue.

12. An automatic cooker including a casing comprising a utility chamber, a broiler chamber and a preheating chamber, a hollow shaft constituting a fuel conduit and arranged in said casing for rotatable movement with respect thereto, a burner arranged on said shaft adjacent its upper end, drive means in said utility chamber for rotating said shaft, heat reflecting means forming a partition between the broiler chamber and said preheating chamber and adapted to receive the flame from said burner, means for supporting said heat reflecting means and for providing a bearing for the upper end of said shaft, a rotatable grille arranged in said broiler chamber, a friction cone carried by said shaft, a spider casting having a central opening formed therein and frictionally engaging said cone for rotatable movement therewith and supporting said grille for movement with said shaft.

13. In a rotary cooker having a cylindrical casing and a centrally disposed drive shaft arranged in said casing for rotatable movement, the combination with said drive shaft of a rotatable grille and means on said drive shaft for yieldably coupling the latter to the grille and comprising a cone arranged on said drive shaft, and a spider member associated with said rotatable grille and having frictional engagement with said cone.

14. In a rotary cooker having a cylindrical casing and a centrally disposed drive shaft arranged in said casing for rotatable movement, the combination with said drive shaft of a rotatable grille and means on said drive shaft for yieldably coupling the latter to the grill, said last named means comprising a friction cone carried by said shaft and a spider casting having a central opening formed therein and adapted to frictionally engage said cone for rotatable movement therewith and having radially extending arms removably supporting said rotatable grille.

SIDNEY DAWSON.